US010036279B2

(12) United States Patent
Ertas et al.

(10) Patent No.: US 10,036,279 B2
(45) Date of Patent: Jul. 31, 2018

(54) THRUST BEARING

(71) Applicant: General Electric Company, Schenectady, NY (US)

(72) Inventors: Bugra Han Ertas, Niskayuna, NY (US); Joshua Tyler Mook, Loveland, OH (US); Jason Joseph Bellardi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/131,173

(22) Filed: Apr. 18, 2016

(65) Prior Publication Data

US 2017/0298766 A1 Oct. 19, 2017

(51) Int. Cl.
*F16C 17/04* (2006.01)
*F01D 25/16* (2006.01)
(Continued)

(52) U.S. Cl.
CPC .......... *F01D 25/164* (2013.01); *F16C 17/047* (2013.01); *F16C 32/0614* (2013.01);
(Continued)

(58) Field of Classification Search
CPC ...... F16C 17/047; F16C 17/035; F16C 17/02; F16C 27/063; F16C 32/0614; F16C 32/0666; F16C 2360/23; F16C 2260/96; F16F 15/0235; F16F 15/162; F01D 25/164; F05D 2220/32; F05D 2240/52; F05D 2240/53; F05D 2260/90
(Continued)

(56) References Cited

U.S. PATENT DOCUMENTS 2,972,504 A   2/1961   Baker
3,004,804 A   10/1961  Pinkus et al.
(Continued)

FOREIGN PATENT DOCUMENTS

CH   550340 A     6/1974
EP   0642130 A2   3/1995
(Continued)

OTHER PUBLICATIONS

Dellacorte et al., "Load Capacity Estimation of Foil Air Journal Bearings for Oil-Free Turbomachinery Applications", Tribology Transactions, Taylor & Francis Online, vol. No. 43, Issue No. 4, pp. 795-801, 2000.
(Continued)

*Primary Examiner* — Marcus Charles
(74) *Attorney, Agent, or Firm* — General Electric Company; Brian Overbeck

(57) ABSTRACT

A bearing including a bearing pad and a housing is provided. The bearing pad has a thrust face for supporting a vibration along an axial direction of the bearing. Additionally, the housing is formed integrally using an additive manufacturing process and is attached to or formed integrally with the bearing pad. The housing defines a working gas delivery system for providing a flow of pressurized working gas to the thrust face of the bearing pad and a fluid damper cavity. The fluid damper cavity provides a dampening of the axial vibration supported by the thrust face of the bearing pad along the axial direction.

19 Claims, 11 Drawing Sheets

(51) Int. Cl.
*F16C 32/06* (2006.01)
*F16C 27/02* (2006.01)

(52) U.S. Cl.
CPC ...... *F16C 32/0622* (2013.01); *F16C 32/0666* (2013.01); *F16C 32/0677* (2013.01); *F05D 2220/32* (2013.01); *F05D 2240/52* (2013.01); *F05D 2240/53* (2013.01); *F05D 2260/96* (2013.01); *F16C 27/02* (2013.01)

(58) Field of Classification Search
USPC .......... 384/99, 103, 109, 114, 117–118, 124, 384/129, 312; 267/113, 118, 122
See application file for complete search history.

(56) References Cited

U.S. PATENT DOCUMENTS

| | | | |
|---|---|---|---|
| 3,110,526 A | 11/1963 | Sternlicht | |
| 3,351,394 A | 11/1967 | Hooker | |
| 3,620,581 A | 11/1971 | Heller et al. | |
| 3,721,479 A | 3/1973 | Rasnick et al. | |
| 3,863,996 A | 2/1975 | Raimondi | |
| 3,891,281 A | 6/1975 | Jenness | |
| 3,898,793 A | 8/1975 | Nakamura et al. | |
| 3,944,304 A | 3/1976 | Purtschert | |
| 3,994,541 A | 11/1976 | Geary et al. | |
| 4,226,483 A | 10/1980 | Yamamoto | |
| 4,262,975 A | 4/1981 | Heshmat et al. | |
| 4,410,220 A | 10/1983 | Robinson | |
| 4,632,574 A | 12/1986 | Wilson et al. | |
| 4,743,125 A | 5/1988 | Dammel et al. | |
| 4,793,722 A | 12/1988 | Jensen | |
| 4,822,182 A * | 4/1989 | Matsushita | F16C 33/748 384/107 |
| 4,872,767 A | 10/1989 | Knapp | |
| 4,921,229 A | 5/1990 | Hori | |
| 4,971,458 A | 11/1990 | Carlson | |
| 5,044,781 A | 9/1991 | Werner | |
| 5,085,521 A | 2/1992 | Singh | |
| 5,149,206 A | 9/1992 | Bobo | |
| 5,222,815 A | 6/1993 | Ide | |
| 5,328,408 A * | 7/1994 | Wolf | F16F 15/1442 464/180 |
| 5,360,273 A | 11/1994 | Buckmann | |
| 5,374,129 A | 12/1994 | Vohr | |
| 5,380,100 A | 1/1995 | Yu | |
| 5,421,655 A | 6/1995 | Ide | |
| 5,501,531 A * | 3/1996 | Hamaekers | B60K 17/24 384/536 |
| 5,603,574 A | 2/1997 | Ide | |
| 5,743,654 A | 4/1998 | Ide | |
| 6,019,515 A | 2/2000 | Fujii et al. | |
| 6,053,636 A * | 4/2000 | Pelfrey | F04D 29/047 384/100 |
| 6,169,332 B1 | 1/2001 | Taylor et al. | |
| 6,308,810 B1 | 10/2001 | Kuwayama | |
| 6,536,565 B2 | 3/2003 | Oliver et al. | |
| 6,679,045 B2 | 1/2004 | Karafillis et al. | |
| 6,700,747 B2 | 3/2004 | Matz | |
| 6,883,967 B2 | 4/2005 | Robb et al. | |
| 7,008,111 B2 * | 3/2006 | Hamke | F01D 3/04 384/107 |
| 7,290,931 B2 | 11/2007 | Wardman et al. | |
| 7,394,076 B2 | 7/2008 | Devitt | |
| 7,431,504 B1 | 10/2008 | Pelfrey | |
| 7,517,152 B1 | 4/2009 | Walsh | |
| 7,607,647 B2 | 10/2009 | Zhao et al. | |
| 7,625,121 B2 | 12/2009 | Pettinato et al. | |
| 7,628,542 B2 | 12/2009 | Wada et al. | |
| 7,896,550 B1 | 3/2011 | Pinera et al. | |
| 7,987,599 B2 | 8/2011 | Mavrosakis | |
| 8,083,413 B2 * | 12/2011 | Ertas | F16C 17/035 384/117 |
| 8,118,570 B2 | 2/2012 | Meacham et al. | |
| 8,146,369 B2 | 4/2012 | Walitzki et al. | |
| 8,206,039 B2 * | 6/2012 | Maier | F16C 27/02 384/99 |
| 8,209,834 B2 | 7/2012 | Mons et al. | |
| 8,240,919 B2 | 8/2012 | Hirata | |
| 8,256,750 B2 * | 9/2012 | Cottrell | B64D 27/26 267/136 |
| 8,272,786 B2 * | 9/2012 | Cottrell | B64D 27/26 384/99 |
| 8,342,796 B2 | 1/2013 | Spencer et al. | |
| 8,591,117 B2 | 11/2013 | Giraud et al. | |
| 8,702,311 B2 | 4/2014 | Matsuo et al. | |
| 8,720,205 B2 | 5/2014 | Lugg | |
| 8,796,893 B2 | 8/2014 | Muth | |
| 8,814,437 B2 | 8/2014 | Braun | |
| 8,834,027 B2 * | 9/2014 | Zeidan | F16F 15/1215 384/117 |
| 8,998,492 B2 | 4/2015 | Bertea | |
| 9,046,001 B2 | 6/2015 | Hindle et al. | |
| 9,121,448 B2 * | 9/2015 | Delgado Marquez | F01D 25/166 |
| 9,169,846 B2 * | 10/2015 | Mariotti | F04D 29/057 |
| 9,297,438 B2 | 3/2016 | Meacham et al. | |
| 2005/0008269 A1 | 1/2005 | Akutsu et al. | |
| 2006/0054660 A1 | 3/2006 | Chappell | |
| 2009/0304313 A1 * | 12/2009 | Ertas | F16C 17/035 384/99 |
| 2010/0183253 A1 * | 7/2010 | Hirata | F16C 13/04 384/118 |
| 2012/0020598 A1 | 1/2012 | New et al. | |
| 2013/0216174 A1 | 8/2013 | Braun | |
| 2014/0140645 A1 | 5/2014 | Meacham et al. | |
| 2014/0154058 A1 | 6/2014 | Meacham et al. | |
| 2014/0286599 A1 | 9/2014 | Devitt et al. | |
| 2015/0063730 A1 | 3/2015 | Sakai | |
| 2015/0104123 A1 | 4/2015 | Ertas et al. | |
| 2015/0275967 A1 | 10/2015 | Ryu | |
| 2016/0146248 A1 * | 5/2016 | Ertas | F16C 32/0622 384/105 |

FOREIGN PATENT DOCUMENTS

| | | | | |
|---|---|---|---|---|
| EP | 2853759 A1 | | 4/2015 | |
| JP | 10299765 A | * | 11/1998 | ............ F16C 17/04 |
| JP | 2001050267 A | | 2/2001 | |
| JP | 2002310142 A | * | 10/2002 | ............ F16C 27/06 |
| JP | 2009030704 A | | 2/2009 | |
| JP | 2009257445 A | * | 11/2009 | ............ F16C 17/06 |
| JP | 2012092969 A | | 5/2012 | |
| WO | WO-2016085673 A1 | * | 6/2016 | .......... F16C 32/0622 |

OTHER PUBLICATIONS

Andres, "Hybrid Flexure Pivot-Tilting Pad Gas Bearings: Analysis and Experimental Validation", Journal of Tribology, ASME, vol. No. 128, Issue No. 3, 551-558, Mar 1, 2006.

Gu et al., "Laser additive manufacturing of metallic components: materials, processes and mechanisms", International Materials Reviews, Maney Online, vol. No. 57, Issue No. 3, pp. 133-164, May 2012.

U.S. Notice of Allowance issued in connection with related U.S. Appl. No. 14/566,798 dated Apr. 26, 2016.

Joshua Tyler Mook et al., field Apr. 18, 2016, U.S. Appl. No. 15/131,136.

Joshua Tyler Mook et al., filed Apr. 18, 2016, U.S. Appl. No. 15/131,154.

Joshua Tyler Mook et al., filed Apr. 18, 2016, U.S. Appl. No. 15/131,164.

Bugra Han Ertas et al., filed Apr. 18, 2016, U.S. Appl. No. 15/131,081.

Bugra Han Ertas et al., filed Apr. 18, 2016, U.S. Appl. No. 15/131,088.

Bugra Han Ertas et al., filed Apr. 18, 2016, U.S. Appl. No. 15/131,097.

Bugra Han Ertas et al., filed Dec. 11, 2014, U.S. Appl. No. 14/566,798.

(56) References Cited

OTHER PUBLICATIONS

Joshua Tyler Mook et al., filed Apr. 18, 2016, U.S. Appl. No. 15/131,113.
Gunter et al., "Design of Nonlinear Squeeze-Film Dampers for Aircraft Engines", Journal of Lubrication Technology, vol. No. 99, Issue No. 01, pp. 57-64, Mar. 10, 1976.
Heshmat et al., "Analysis of Gas-Lubricated Foil Journal Bearings", Journal of Lubrication Technology, vol. No. 105, Issue No. 4, pp. 647-655, Oct. 1, 1983.
Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.
U.S. Non-Final Office Action issued in connection with related U.S. Appl. No. 15/131,113 dated Nov. 17, 2016.
European Search Report and Opinion Issued in connection with related EP Application No. 17165709.1 dated May 31, 2017.
U.S. Non-Final Office Action Issued in connection with related U.S. Appl. No. 15/131,081 dated Jun. 13, 2017.
U.S. Non-Final Rejection issued in connection with related U.S. Appl. No. 15/131,136 dated May 8, 2017.
Extended European Search Report and Opinion Issued in connection with corresponding EP Application No. 17156466.9 dated Sep. 19, 2017.
Canadian Office Action issued in connection with corresponding CA Application No. 2958060 dated Feb. 2, 2018.

\* cited by examiner

US 10,036,279 B2

THRUST BEARING

FIELD OF THE INVENTION

The present subject matter relates generally to an air bearing, or more particularly to a thrust air bearing that may be used in a gas turbine engine. This invention was made with government support under contract number DE-EE0007109 of the Department of Energy. The government may have certain rights in the invention.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements required for optimal operation under given operating conditions. These rotor assemblies have a mass generating a constant static force due to gravity, and also generate a dynamic force due, e.g., to imbalances in the rotor assembly during operation, accelerations, etc. In addition to radial shaft forces, the rotating assembly also experiences axial forces generated from, e.g., internal pressures between the turbomachinery stages and the thrust of the gas turbine engine. Such gas turbine engines include radial bearings and thrust bearings to sustain and support these forces while permitting rotation of the rotor assembly.

At least some known rotary machines use gas bearings where non-oil lubricated bearings are desired. However, the inventors have observed that some gas bearings require a substantial number of assembled components to provide the necessary functionality to meet dynamic loading requirements. Such a high number of components introduce high complexity, cost, and weight to the gas bearing, thereby limiting potential applications, especially in aerospace gas turbine engines where weight reduction is paramount. Moreover, the high number of components increases a size of the gas bearing without providing additional functionality, thereby preventing the gas bearing from being utilized within space limited locations throughout the gas turbine engines, such as aircraft engines.

Therefore, a gas bearing formed of less components would be useful. More particularly, a gas bearing capable of effectively handling static and dynamic forces during operation while having a reduced size and weight would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a bearing defining an axial direction is provided. The bearing includes a bearing pad having a thrust face for supporting a vibration along the axial direction of the bearing. The bearing also includes a housing attached to or formed integrally with the bearing pad and defining a working gas delivery system for providing a flow of pressurized working gas to the thrust face of the bearing pad. The housing also defines a fluid damper cavity for providing a dampening of the axial vibration supported by the thrust face of the bearing pad along the axial direction.

In another exemplary embodiment of the present disclosure, a bearing for a gas turbine engine is provided. The bearing defines an axial direction and includes a bearing pad having a thrust face for supporting a vibration along the axial direction of the bearing. The bearing also includes a housing attached to or formed integrally with the bearing pad. The housing defines a working gas delivery system for providing a flow of pressurized working gas to the thrust face of the bearing pad. The housing also defines a fluid damper cavity for providing a dampening of the axial vibration supported by the thrust face of the bearing pad along the axial direction. The fluid damper cavity includes a first control volume and a second control volume. The housing additionally includes a first semi-rigid wall and a second semi-rigid wall, the first semi-rigid wall at least partially defining the first control volume and the second semi-rigid wall at least partially defining the second control volume.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
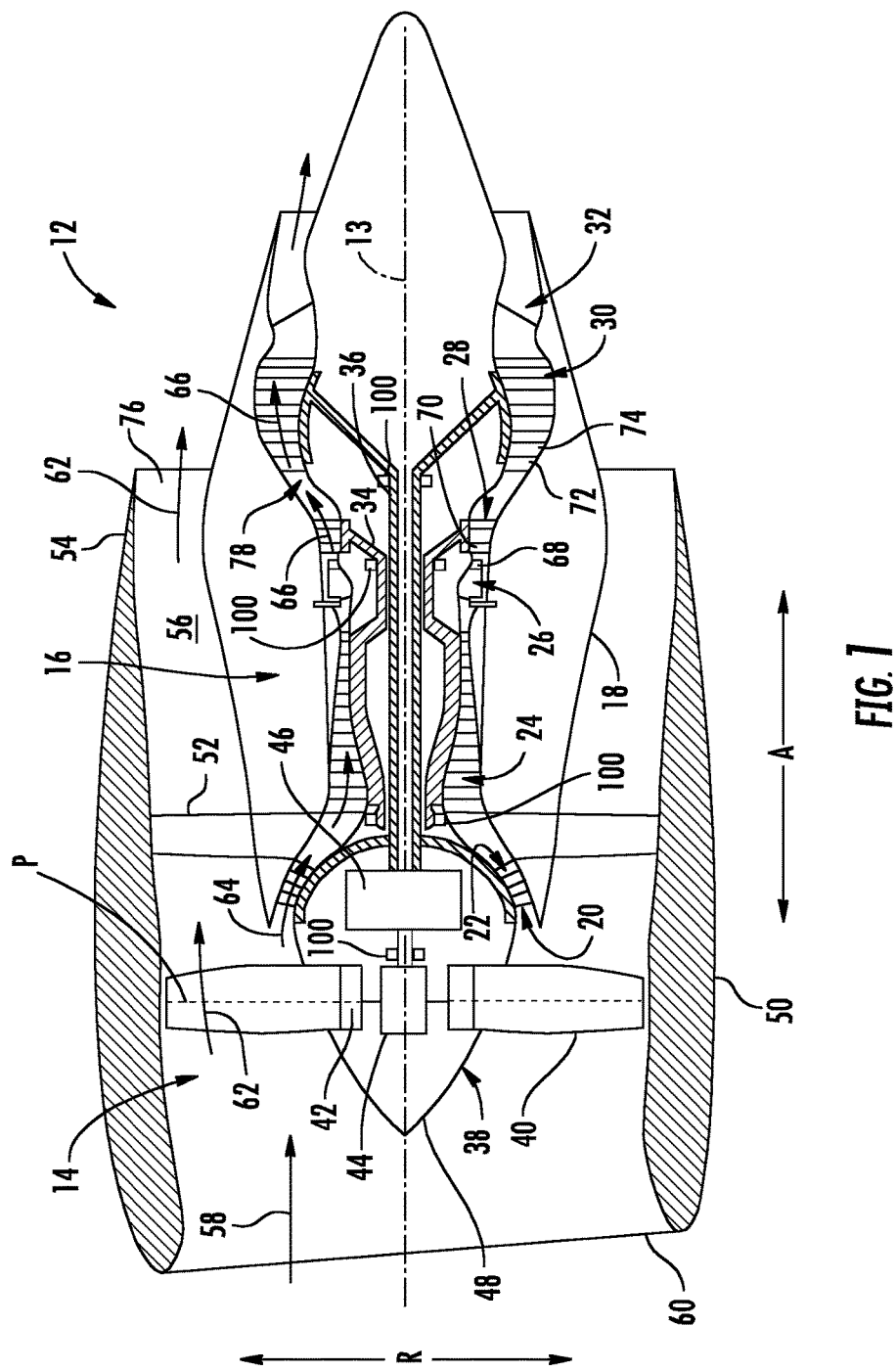
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A1 (extending parallel to a longitudinal centerline 13 provided for reference), a radial direction R1, and a circumferential direction (not shown) extending about the axial direction A1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A1 during operation of the turbofan engine 12.

In order to support such rotary components, the turbofan engine includes a plurality of air bearings 100 attached to various structural components within the turbofan engine 12. Specifically, for the embodiment depicted the bearings 100 facilitate rotation of, e.g., the LP shaft 36 and HP shaft 34 and dampen vibrational energy imparted to bearings 100 during operation of the turbofan engine 12. Although the bearings 100 are described and illustrated as being located generally at forward and aft ends of the respective LP shaft 36 and HP shaft 34, the bearings 100 may additionally, or alternatively, be located at any desired location along the LP shaft 36 and HP shaft 34 including, but not limited to, central or mid-span regions of the shafts 34, 36, or other locations along shafts 34, 36 where the use of conventional bearings 100 would present significant design challenges. The exemplary bearings 100 may include radial support bearings for supporting static and dynamic forces along the radial direction R1, as well as axial support bearings, or thrust bearings, for supporting static and dynamic forces along the axial direction A1. Further, the bearings 100 may be used in combination with conventional oil-lubricated bearings. For example, in one embodiment, conventional oil-lubricated bearings may be located at the ends of shafts 34, 36, and one or more bearings 100 may be located along central or mid-span regions of shafts 34, 36.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a power generation gas turbine engine, a steam turbine, a centrifugal compressor, and/or a turbocharger.

Figure 2:
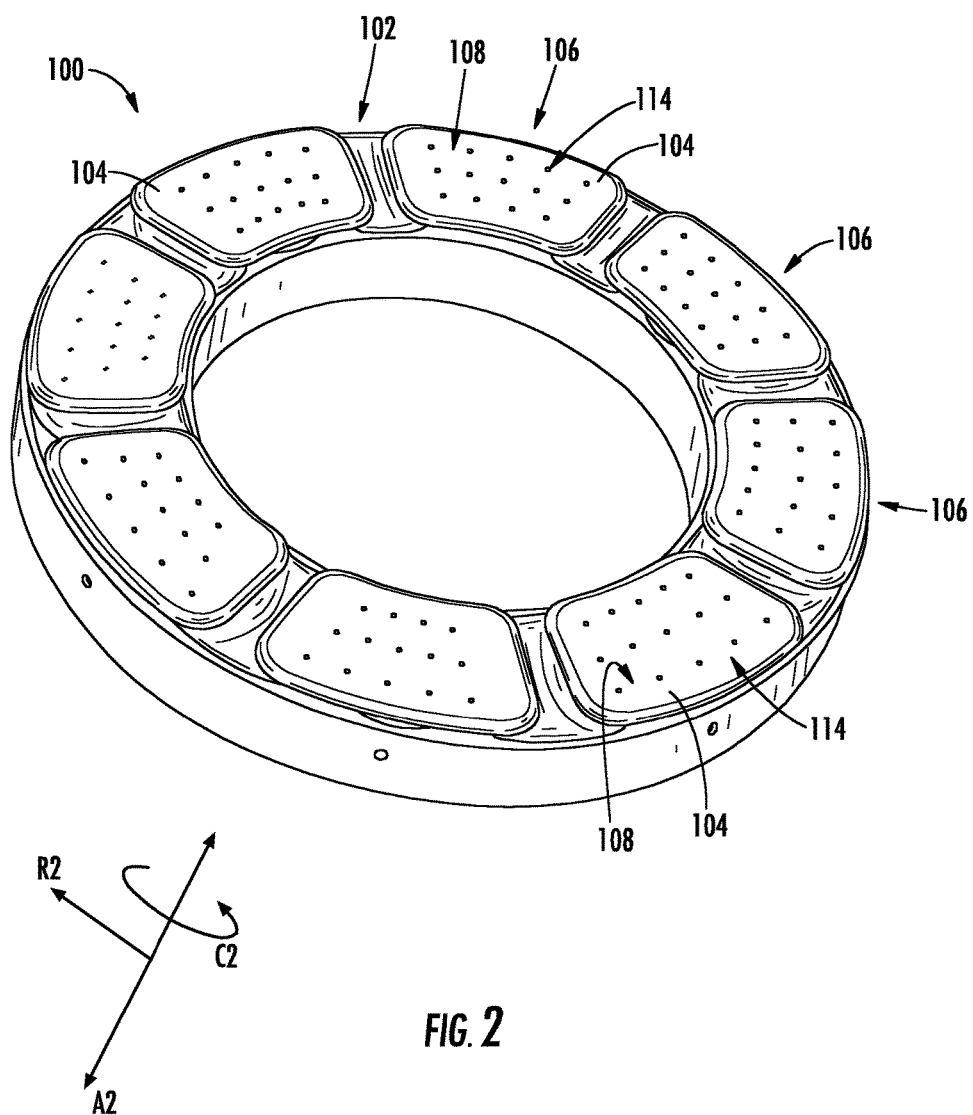
FIG. 2 is a perspective view of a bearing in accordance with an exemplary embodiment of the present disclosure.
Figure 3:
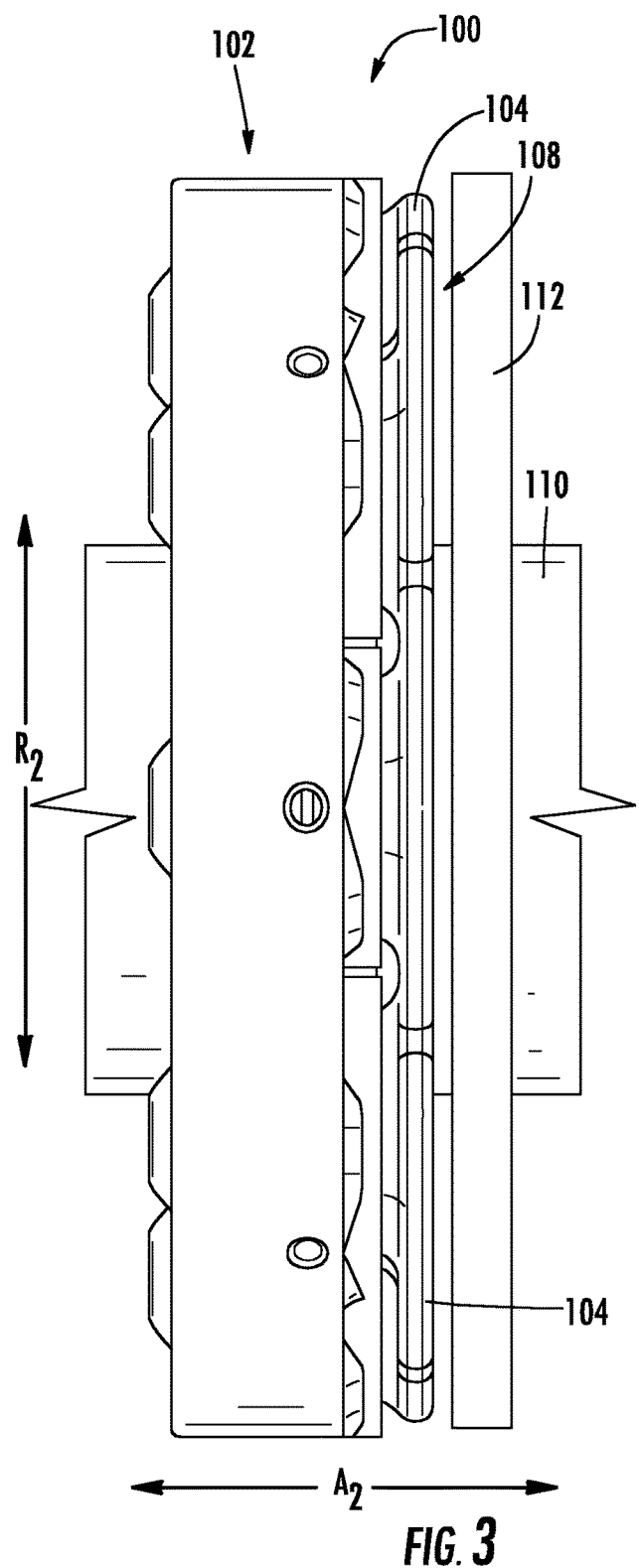
FIG. 3 is a side view of the exemplary bearing of FIG. 2 supporting a rotary component.
Figure 4:
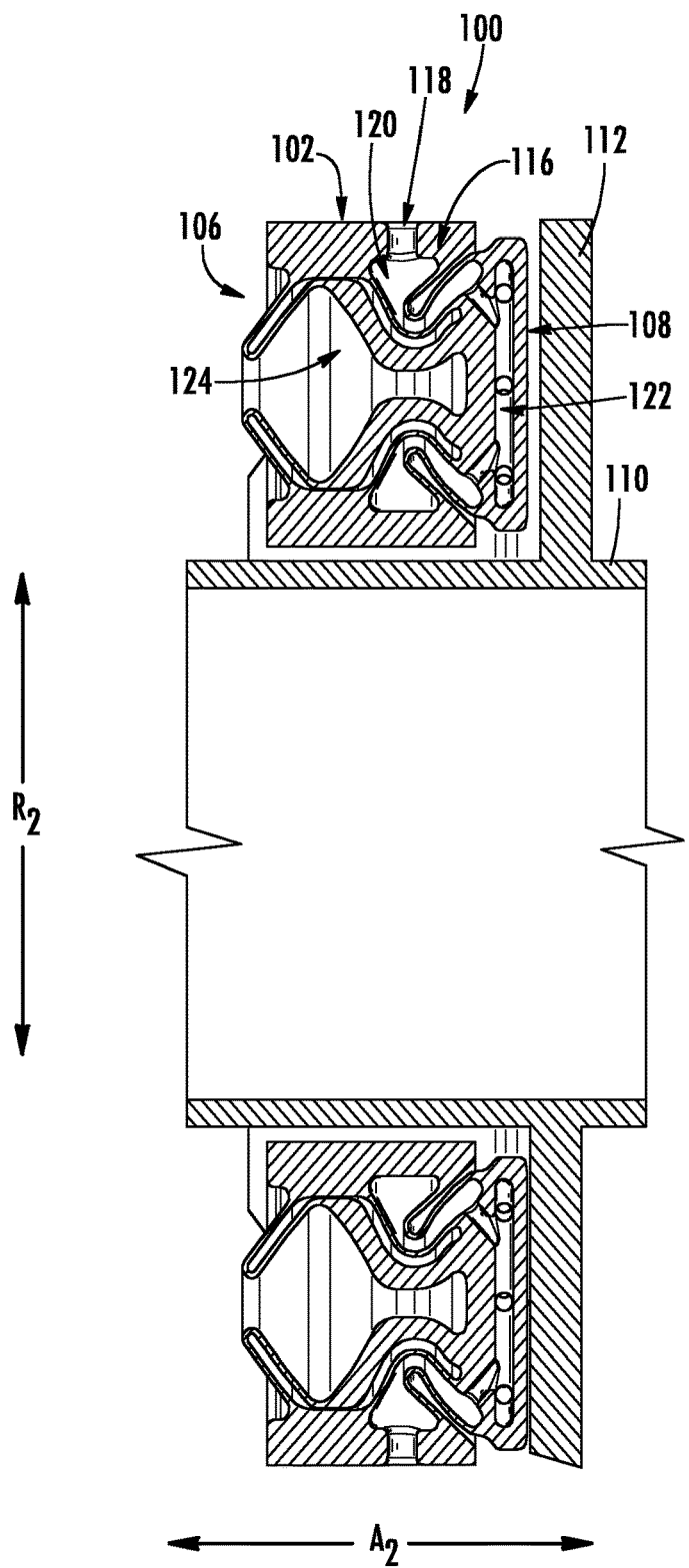
FIG. 4 is a side, cross-sectional view of the exemplary bearing of FIG. 2 supporting a rotary component.

Referring now to FIGS. 2 through 4, a bearing 100 in accordance with an exemplary embodiment of the present disclosure is provided. Specifically, FIG. 2 provides a perspective view of the exemplary bearing 100; FIG. 3 provides a side view of the exemplary bearing 100 of FIG. 2 supporting a rotary component 110; and FIG. 4 provides a side, cross-sectional view of the exemplary bearing 100 of FIG. 2 supporting the rotary component 110.

As shown, the exemplary bearing 100 generally defines an axial direction A2, a radial direction R2, and a circumferential direction C2. The bearing 100 generally includes a housing 102 and a bearing pad 104, or rather, for the embodiment depicted, the bearing 100 generally includes a plurality of sections 106, each section 106 including a portion of the housing 102 and a bearing pad 104. For each section 106, the bearing pad 104 includes a thrust face 108 or surface for supporting a vibration (also referred to as a thrust load) along the axial direction A2 of the bearing 100. Accordingly, the bearing 100 may be referred to as a thrust bearing. The axial vibration may be generated by a rotary component 110 of a gas turbine engine into which the bearing 100 is installed. For example, in certain exemplary embodiments, the axial vibration may be generated by one or more shafts, such as an LP shaft 36 or an HP shaft 34, of a gas turbine engine into which the bearing 100 is installed (see FIG. 1). Referring particularly to FIGS. 3 and 4, the rotary component 110 may include a thrust runner 112 extending outward generally along the radial direction R2 for interfacing with the bearing 100.

For the embodiment depicted, the bearing pads 104 of each of the plurality of sections 106 are substantially identical and are substantially evenly spaced along the circumferential direction C2. Further, as will be discussed in greater detail below, the bearing pads 104 of each of the plurality of sections 106 are configured to receive a flow of working gas (e.g., air, compressed air and combustion gases, or the like) during operation to create separation with the rotary component 110 by creating a thin film of working gas between the bearing pad 104 and rotary component 110. The bearing 100 may, in such a manner, provide a low friction means for supporting such rotary component 110 (or rather the thrust runner 112 of the rotary component 110).

More particularly, the exemplary bearing pads 104 are configured to disperse and/or diffuse the working gas to support and/or lubricate the rotary component 110 during operation of the bearing 100. For example, the exemplary bearing pad 104 depicted includes a plurality of gas distribution holes 114 disposed across the bearing pad 104 to provide an evenly distributed pressure field on the thrust face 108 for supporting and/or lubricating the rotary component 110.

The plurality of gas distribution holes 114 may be configured having any dimensions or arrangements (e.g., array, pattern or configuration) suitable to function as described herein. For example, in some embodiments, the plurality of gas distribution holes 114 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, in some embodiments, each bearing pad 104 may have a sufficiently high gas permeability to permit the working gas to generate sufficient pressure on the thrust face 108 to provide the support and/or lubrication for the rotary component 110. Alternatively still, each bearing pad 104 may define a recessed portion at a center of the bearing pad 104 for delivering the working gas.

Referring particularly to FIG. 4, and now also to FIG. 5, providing a close-up, cross-sectional view of one section 106 of the exemplary bearing 100, an individual section 106 of the bearing 100 will be described in greater detail. As depicted, the housing 102 included within such section 106 is configured to provide the flow of working gas to the thrust face 108 of the bearing pad 104. Specifically, the housing 102 defines a working gas delivery system 116 for providing the flow of pressurized working gas to the thrust face 108 of the bearing pad 104. The working gas delivery system 116 defined by the housing 102 generally includes an inlet gas port 118 for receiving a flow of pressurized gas and a working gas delivery chamber 120. When the bearing 100 is installed in a gas turbine engine, the inlet gas port 118 may be in airflow communication with, e.g., one or more locations of a compressor section 106 of the gas turbine engine. For example, when the bearing 100 is installed in the exemplary turbofan engine of FIG. 1, the inlet gas port 118 may be in airflow communication with, e.g., an LP compressor 22, an area of the core air flowpath 37 located downstream of the LP compressor 22, an HP compressor 24 (such as an aft stage of the HP compressor 24), or an area of the core air flowpath 37 located downstream of the HP compressor 24.

The working gas delivery chamber 120 is in airflow communication with the inlet gas port 118 and is located downstream of the inlet gas port 118. The working gas delivery chamber 120 is configured to provide the pressurized flow of working gas directly to the bearing pad 104. For the embodiment depicted, the exemplary bearing pad 104 defines a labyrinth of channels 122 in airflow communication with the working gas delivery chamber 120 via one or more connection channels 123. The channels 122 are configured to disperse a flow of pressurized working gas from the working gas delivery chamber 120 through the plurality of gas distribution holes 114 defined by the bearing pad 104 (i.e., through the thrust face 108).

Figure 5:
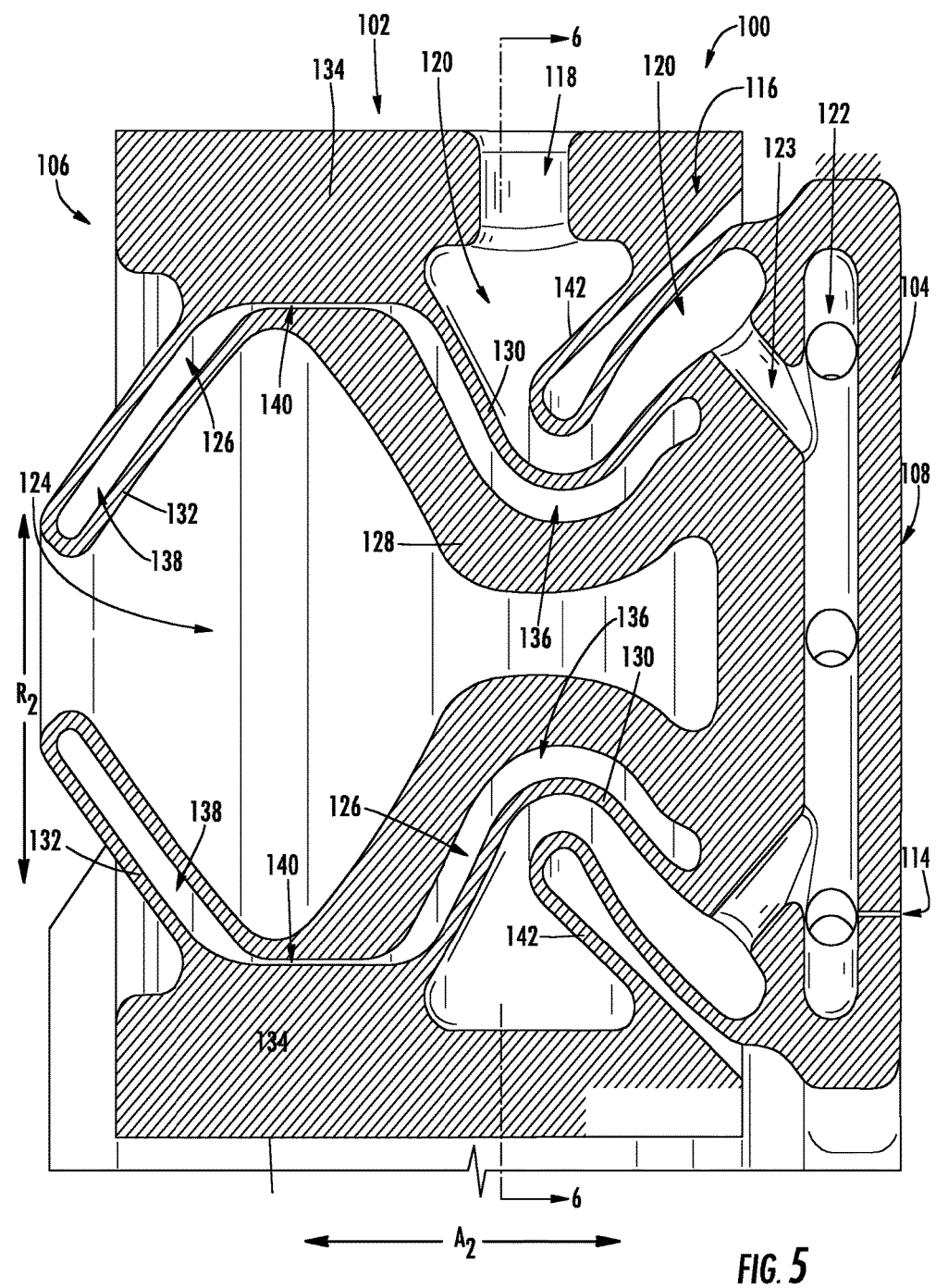
FIG. 5 is a close-up, cross-sectional view of a section of the exemplary bearing of FIG. 2.

Referring still to the section 106 of the bearing 100 depicted in FIGS. 4 and 5, the housing 102 additionally includes a damper assembly 124 for dampening axial vibration of the rotating assembly supported by the thrust face 108 of the bearing pad 104. Specifically, the exemplary housing 102 depicted further defines a fluid damper cavity 126 for providing a dampening of axial vibration of the rotating assembly supported by the thrust face 108 of the bearing pad 104 along the axial direction A2. Referring particularly to the exemplary embodiment of FIG. 5, the housing 102 of the exemplary bearing 100 generally includes a rigid column 128, a first semi-rigid wall 130, a second semi-rigid wall 132, and a body portion 134. The rigid column 128 is attached to or formed integrally with the bearing pad 104. The first semi-rigid wall 130 is attached to or formed integrally with the bearing pad 104 and extends to the body portion 134 of the housing 102. Additionally, the second semi-rigid wall 132 extends between the rigid column 128 and the body portion 134 of the housing 102

Moreover, for the embodiment depicted the exemplary fluid damper cavity 126 defined by the housing 102 includes a first control volume 136, a second control volume 138, and a damper gap 140. The first control volume 136 is in restrictive flow communication with the second control volume 138 through the damper gap 140. Additionally, the first semi-rigid wall 130 and rigid column 128 together define at least in part the first control volume 136 and the second semi-rigid wall 132 defines at least in part the second control volume 138. The damper gap 140 is defined between the rigid column 128 and a rigid body portion 134 of the housing 102.

It should be appreciated, that as used herein, the terms "semi-rigid" and "rigid" are relative terms. Accordingly, a portion of a component of the bearing 100 described as semi-rigid may be configured to bend, flex, or give way prior to a portion of a component of the bearing 100 described as rigid. For the embodiment depicted, the semi-rigid portions of the various components are created by forming such portions with a lesser thickness as compared to the rigid portions of such components. Further, a component of the bearing 100 described as "semi-rigid" herein refers to a component configured to bend, flex, or give way during normal operation of the bearing 100 while incurring little or no damage.

Notably, the fluid damper cavity 126 is a sealed fluid damper cavity (i.e., defines a fixed volume at constant temperatures and pressures) and during operation is completely filled with an incompressible fluid, such as an incompressible oil or other incompressible liquid. Accordingly, when an axial vibration is exerted on the bearing pad 104 along the axial direction A2, the bearing pad 104 may absorb such force by moving inward towards the housing 102. In response, the first semi-rigid wall 130 of the housing 102 may deform in such a manner that a volume of the first control volume 136 of the fluid damper cavity 126 decreases by a certain amount ("deltaV"). The decrease in volume of the first control volume 136, deltaV, forces an amount of incompressible fluid through the damper gap 140 and into the second control volume 138. The second semi-rigid wall 132 of the housing 102 may simultaneously deform in such a manner that a volume of the second control volume 138 of the fluid damper cavity 126 increases in the same amount that the first control volume 136 decreases (i.e., deltaV), such that the second control volume 138 receives all of the transferred incompressible fluid.

Notably, the damper gap 140 defines a relatively small clearance, such that the damper gap 140 may resist vibratory movement of the bearing pad 104 along the axial direction A2. Such a configuration provides the viscous energy dissipation, and therefore dampening. Accordingly, a size of the damper gap 140 may be designed for the anticipated amount of dampening required. Further, in the absence of the thrust force exerted on the bearing pad 104, the incompressible fluid transferred to the second control volume 138 may reverse in flow direction, and flow back through the damper gap 140 to the first control volume 136.

As is also depicted in the exemplary embodiment of FIG. 5, the housing 102 further comprises a third, outer semi-rigid wall 142 extending between the body portion 134 of the housing 102 and the bearing pad 104. The working gas delivery chamber 120 is defined at least in part by the outer semi-rigid wall 142, and for the embodiment depicted is further defined by the first semi-rigid wall 130 and the body portion 134 of the housing 102. Further, the working gas delivery chamber 120 is concentric with at least a portion of the fluid damper cavity 126. More specifically, for the embodiment depicted, the working gas delivery chamber 120 is concentric with the first control volume 136 of the fluid damper cavity 126.

Notably, for the embodiment depicted, the outer semi-rigid wall 142 is attached to or formed integrally with the bearing pad 104. In addition to providing the dampening forces described above, the various semi-rigid walls may also act to support the bearing pad 104 and resist an axial vibration acting on the bearing pad 104. For example, during operation, the various semi-rigid walls may act as springs for supporting the bearing pad 104 and limiting axial deflections of the rotating assembly.

Figure 6:
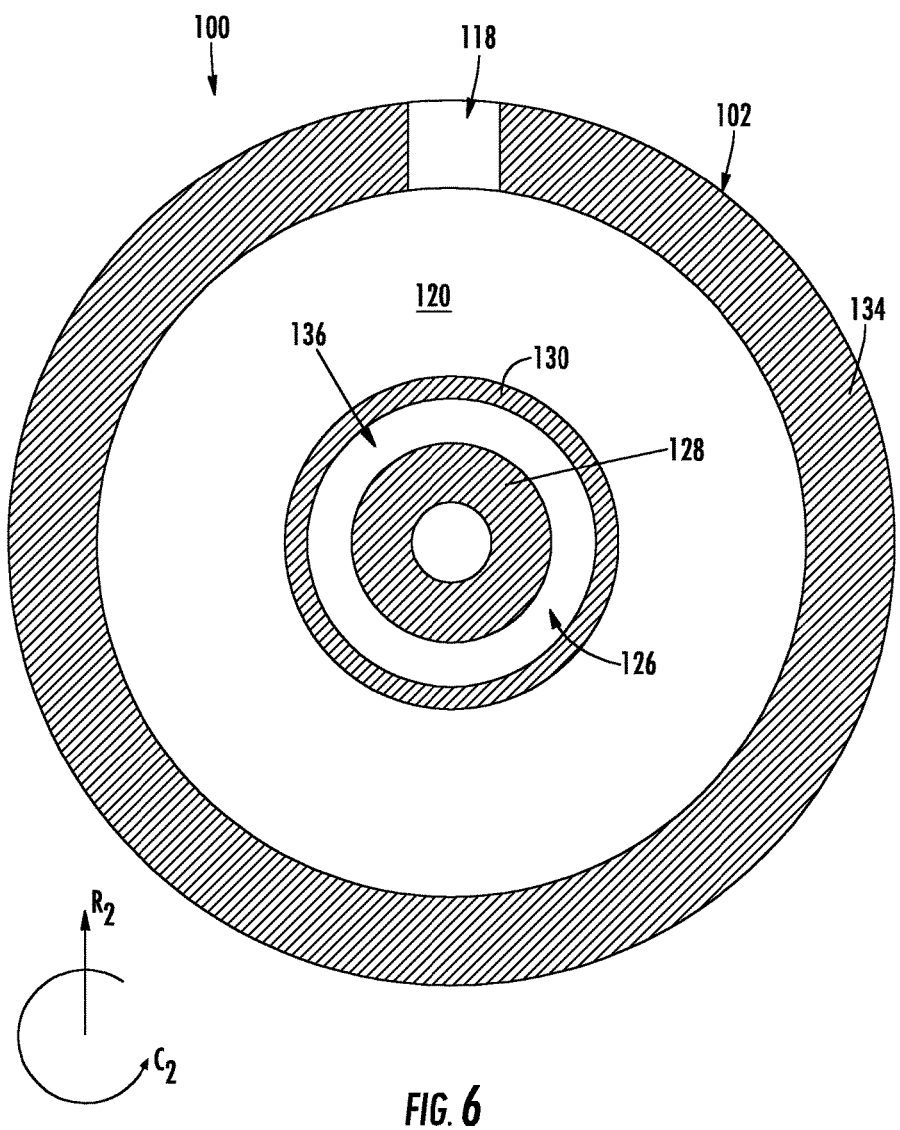
FIG. 6 is a close-up, cross-sectional view of a section of the exemplary bearing of FIG. 2, taken along Line 6-6 of FIG. 5.

Reference will now be made briefly to FIG. 6, providing a cross-sectional view of a section 106 of the exemplary bearing 100 identified by Line 6-6 in FIG. 5. As shown, for the embodiment depicted the fluid damper cavity 126 and working gas delivery system 116, or rather the working gas delivery chamber 120 of the working gas delivery system 116, are generally annular in shape. More particularly, as is shown, the column 128 defines a generally circular shape and at least a portion of the fluid damper cavity 126 extend substantially three hundred and sixty degrees (360°) around the column 128. Further, the working gas delivery chamber 120 extends substantially three hundred and sixty degrees (360°) around the column 128. More particularly, for the embodiment depicted, the fluid damper cavity 126 extends completely around the column 128 defining an annular shape and the working gas delivery chamber 120 extends completely around the fluid damper cavity 126 and the column 128, also defining an annular shape.

Referring now back generally to FIGS. 2 through 6, it should be appreciated that for the embodiment depicted, each section 106 of the housing 102 of the bearing 100 is formed integrally using an additive manufacturing process. Further, for the embodiment depicted, each section 106 bearing 100, including a portion of the housing 102 and a respective bearing pad 104 is formed integrally using an additive manufacturing process. Moreover, for the embodiment depicted, all sections 106 of the bearing 100 are formed integrally using an additive manufacturing process.

As used herein, the term "additive manufacturing process" refers to any rapid prototyping, rapid manufacturing, or 3D printing process, such as selective laser sintering (SLS), direct metal laser sintering (DMLS), electron beam melting (EBM), diffusion bonding, or selective heat sintering (SHS). It should be appreciated, however, that in other embodiments one or more of the sections 106 of the bearing 100, including a bearing pad 104 and a respective portion of the housing 102, may be formed integrally using an additive manufacturing process and joined to separately formed, adjacent sections 106 of the bearing 100 in any other suitable manner, such as through bolts, welding, or any other suitable mechanical fastening device or means.

Figure 7:
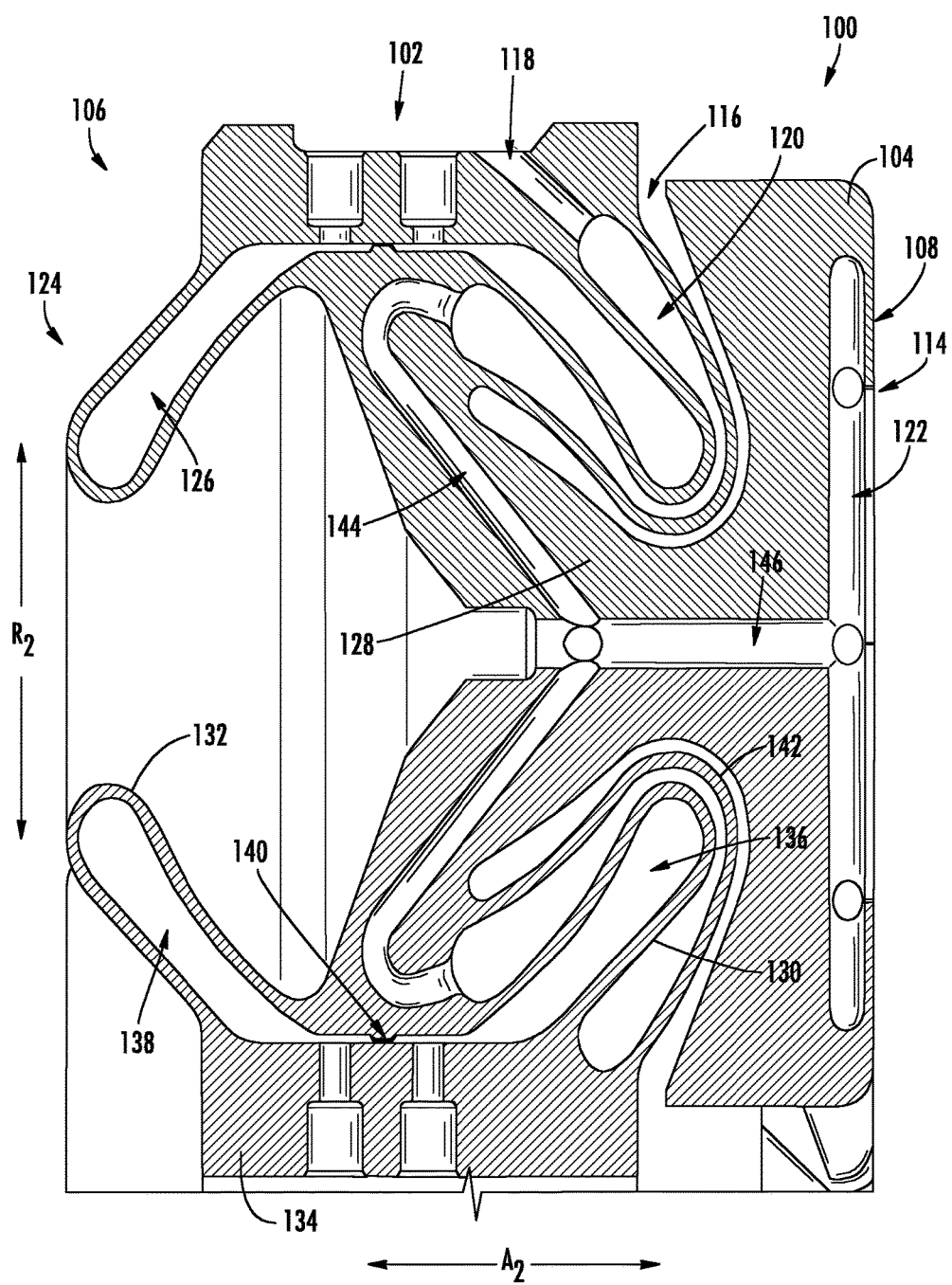
FIG. 7 is a close-up, cross-sectional view of a section of a bearing in accordance with another exemplary embodiment of the present disclosure.

Referring now to FIG. 7, a close-up, cross-sectional view of one section 106 of an exemplary bearing 100 in accordance with another exemplary embodiment of the present disclosure is provided. The exemplary bearing 100 depicted in FIG. 7 may be configured in substantially the same manner as the exemplary bearing described above with reference to FIGS. 2 through 6, and therefore the same or similar numbers may refer to the same or similar part. Additionally, the viewpoint depicted in FIG. 7 of the exemplary bearing 100 may be the same viewpoint of the exemplary bearing 100 provided in FIG. 5.

For example, as is depicted, the exemplary bearing of FIG. 7 generally includes a housing 102 attached to or formed integrally with a bearing pad 104. The bearing pad 104 defines a thrust face 108 for supporting vibrations along an axial direction A2 of a rotary component 110. For example, the housing 102 includes a damper assembly 124 for dampening axial vibration of the rotating assembly supported by the thrust face 108 of the bearing pad 104. Specifically, the exemplary housing 102 depicted further defines a fluid damper cavity 126 for providing a dampening of axial vibration of the rotating assembly supported by the thrust face 108 of the bearing pad 104 along the axial direction A2.

Referring particularly to the exemplary embodiment of FIG. 7, the housing 102 of the exemplary bearing 100 generally includes a rigid column 128, a first semi-rigid wall 130, a second semi-rigid wall 132, and a body portion 134. The rigid column 128 is attached to or formed integrally with the bearing pad 104. The first semi-rigid wall 130 is attached to or formed integrally with the body portion 134 of the housing 102 and extends along a serpentine path to the column 128 to define a "U-shape" or loop. Additionally, the second semi-rigid wall 132 is similarly attached to or formed integrally with the body portion 134 of the housing 102 and extends along a serpentine path to the column 128, also defining a "U-shape" or loop.

Moreover, for the embodiment depicted the exemplary fluid damper cavity 126 defined by the housing 102 includes a first control volume 136, a second control volume 138, and a damper gap 140. The first control volume 136 is in restrictive flow communication with the second control volume 138 through the damper gap 140. The damper gap 140 is defined between the outer edges of the column 128 and the body portion 134 of the housing 102. Additionally, the first semi-rigid wall 130 substantially completely defines the first control volume 136 and the second semi-rigid wall 132 substantially completely defines the second control volume 138. The damper gap 140 is defined between the rigid column 128 and a rigid body portion 134 of the housing 102. In such a manner, the first and second semi-rigid walls 130, 132 may allow for a desired amount of flexibility for the first control volume 136 and second control volume 138.

Similar to the embodiment described above, the fluid damper cavity 126 is a sealed fluid damper cavity (i.e., defines a fixed volume at constant temperatures and pressures) and during operation is completely filled with an incompressible fluid, such as an incompressible oil or other incompressible liquid. Accordingly, when an axial vibration is exerted on the bearing pad 104 along the axial direction A2, the bearing pad 104 may absorb such force by moving inward towards the housing 102. In response, the first semi-rigid wall 130 of the housing 102 may deform in such a manner that a volume of the first control volume 136 of the fluid damper cavity 126 decreases by a certain amount ("deltaV"). The decrease in volume of the first control volume 136, deltaV, forces an amount of incompressible fluid through the damper gap 140 and into the second control volume 138. The second semi-rigid wall 132 of the housing 102 may simultaneously deform in such a manner that a volume of the second control volume 138 of the fluid damper cavity 126 increases in the same amount that the first control volume 136 decreases (i.e., deltaV), such that the second control volume 138 receives all of the transferred incompressible fluid.

Additionally, the damper gap 140 may operate in substantially the same manner as exemplary damper gap 140 described above with reference to the embodiment of FIGS. 2 through 6, to resist vibratory movement of the bearing pad 104 along the axial direction A2.

Moreover, the housing 102 defines a working gas delivery system 116 for providing a flow of pressurized working gas to the thrust face 108 of the bearing pad 104. The working gas delivery system 116 defined by the housing 102 generally includes an inlet gas port 118 for receiving a flow of pressurized gas, a working gas delivery chamber 120, a plurality of connection channels 144, and a central connection column 146. The working gas delivery chamber 120 is in airflow communication with the inlet gas port 118 and is located downstream of the inlet gas port 118. For the embodiment depicted, the working gas delivery chamber 120 is an annular chamber. Further, the housing 102 additionally includes a third, semirigid wall 142 also extending from the body portion 134 of the housing 102 and a serpentine manner to the column 128. The third semi-rigid wall 142 is generally concentric with the first semi-rigid wall 130, and together with the first semi-rigid wall 130, substantially completely defines the working gas delivery chamber 120.

The working gas delivery chamber 120 is configured to provide the pressurized flow of working gas to the plurality of connection channels 144, which in turn provide the pressurized flow of working gas to the central connection column 146, which in turn provides the pressurized flow of working gas to the bearing pad 104. For the embodiment depicted, the connection channels 144 include a plurality of circumferentially spaced connection channels 144 defined in the column 128 of the bearing 100 and extending from the working gas delivery chamber 120 to the central connection column 146. Additionally, the exemplary bearing pad 104 defines a labyrinth of channels 122 in airflow communication with the working gas delivery chamber 120 via the plurality of connection channels 144 and central column 146. The channels 122 are configured to disperse a flow of pressurized working gas from the working gas delivery chamber 120 through the plurality of gas distribution holes 114 defined by the bearing pad 104 (i.e., through the thrust face 108).

Figure 8:
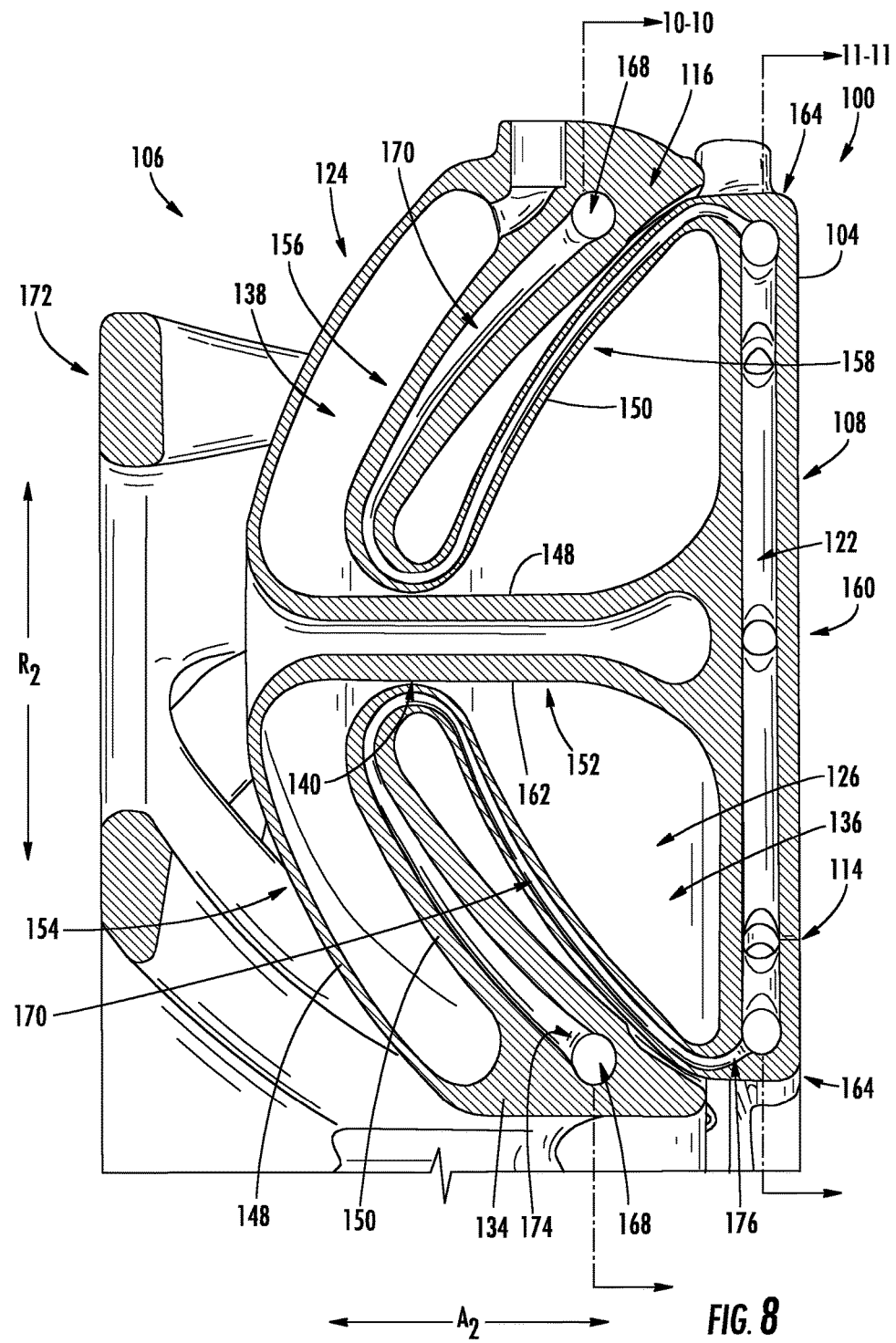
FIG. 8 is a close-up, cross-sectional view of a section of a bearing in accordance with yet another exemplary embodiment of the present disclosure.

Referring now to FIG. 8, a close-up, cross-sectional view of one section 106 of a bearing 100 in accordance with yet another exemplary embodiment of the present disclosure is provided. The exemplary bearing 100 depicted in FIG. 8 may be configured in substantially the same manner as the exemplary bearing described above with reference to FIGS. 2 through 6, and therefore the same or similar numbers may refer to the same or similar part. Additionally, the viewpoint depicted in FIG. 8 of the exemplary bearing 100 may be the same viewpoint of the exemplary bearing 100 provided in FIG. 5.

For example, as is depicted, the exemplary bearing of FIG. 8 generally includes a housing 102 attached to or formed integrally with a bearing pad 104. The bearing pad 104 defines a thrust face 108 for supporting vibrations along an axial direction A2 of a rotary component 110. For example, the housing 102 includes a damper assembly 124 for dampening axial vibration of the rotating assembly supported by the thrust face 108 of the bearing pad 104. Specifically, the exemplary housing 102 depicted further defines a fluid damper cavity 126 for providing a dampening of axial vibration of the rotating assembly supported by the thrust face 108 of the bearing pad 104 along the axial direction A2.

Referring particularly to the exemplary embodiment of FIG. 8, the housing 102 of the exemplary bearing 100 generally includes a body portion 134, a first, inner wall 148, and a second, outer wall 150. The inner wall 148 is attached to or formed integrally with the bearing pad 104, and extends to the body portion 134 of the housing 102. Further, the inner wall 148 includes a rigid portion 152 and a semirigid portion 154. The rigid portion 152 is attached to or formed integrally with the bearing pad 104 proximate a center 160 of the bearing pad 104 (the center 160 of the bearing pad 104 defined as a center along an axial direction A2 and a circumferential direction C2 (see FIGS. 10 and 11)), and extends away from the bearing pad 104 generally along a radial direction R2. The rigid portion 152 of the inner wall 148 defines a column 162. The semirigid portion 154 of the inner wall 148 extends from the column 162 to the body portion 134 of the housing 102.

Additionally, the outer wall 150 is attached to or formed integrally with the bearing pad 104 at a location spaced from the center 160 of the bearing pad 104, and proximate an outer periphery 164 of the bearing pad 104. The outer wall 150 extends to the body portion 134 of the housing 102 and additionally includes a semirigid portion 158 and a rigid portion 156. For the embodiment depicted, the semirigid portion 158 is attached to or formed integrally with the bearing pad 104 proximate the outer periphery 164 of the bearing pad 104 and extends towards the column 162 formed by the inner wall 148. The semirigid portion 158 of the outer wall 150 transitions to the rigid portion 156 and extends away from the column 162 formed by the inner wall 148 to the body portion 134 of the housing 102.

Moreover, for the embodiment depicted the exemplary fluid damper cavity 126 defined by the housing 102 includes a first control volume 136, a second control volume 138, and a damper gap 140. The first control volume 136 is in restrictive flow communication with the second control volume 138 through the damper gap 140. The damper gap 140 is defined between the inner wall 148 and the outer wall 150. More particularly, the damper gap 140 is defined between the rigid portion 152 of the inner wall 148 and the outer wall 150. Additionally, the first control volume 136 is defined by the semirigid portion 158 of the outer wall 150, the bearing pad 104, and a section of the rigid portion 152 of the inner wall 148. Further, the second control volume 138 is defined by the rigid portion 156 of the outer wall 150, the semirigid portion 154 of the inner wall 148, and a section of the rigid portion 152 of the inner wall 148.

The first control volume 136 and second control volume 138 each define an annular shape with respect to the column 162. Further, the fluid damper cavity 126 is a sealed fluid damper cavity (i.e., defines a fixed volume at constant temperatures and pressures) and during operation is completely filled with an incompressible fluid, such as an incompressible oil or other incompressible liquid. The first and second control volumes 136, 138 and damper gap 140 may operate in substantially the same manner as the first and second control volumes 136, 138 and damper gap 140 of the exemplary embodiments described above with respect to, e.g., FIG. 2 through 6 and/or FIG. 7.

Moreover, the housing 102 defines a working gas delivery system 116 for providing a flow of pressurized working gas to the thrust face 108 of the bearing pad 104. The working gas delivery system 116 defined by the housing 102 generally includes an inlet gas port 118 for receiving a flow of pressurized gas, a working gas delivery extension 166, a gas distribution ring 168, and a plurality of individual gas delivery channels 170.

Figure 9:
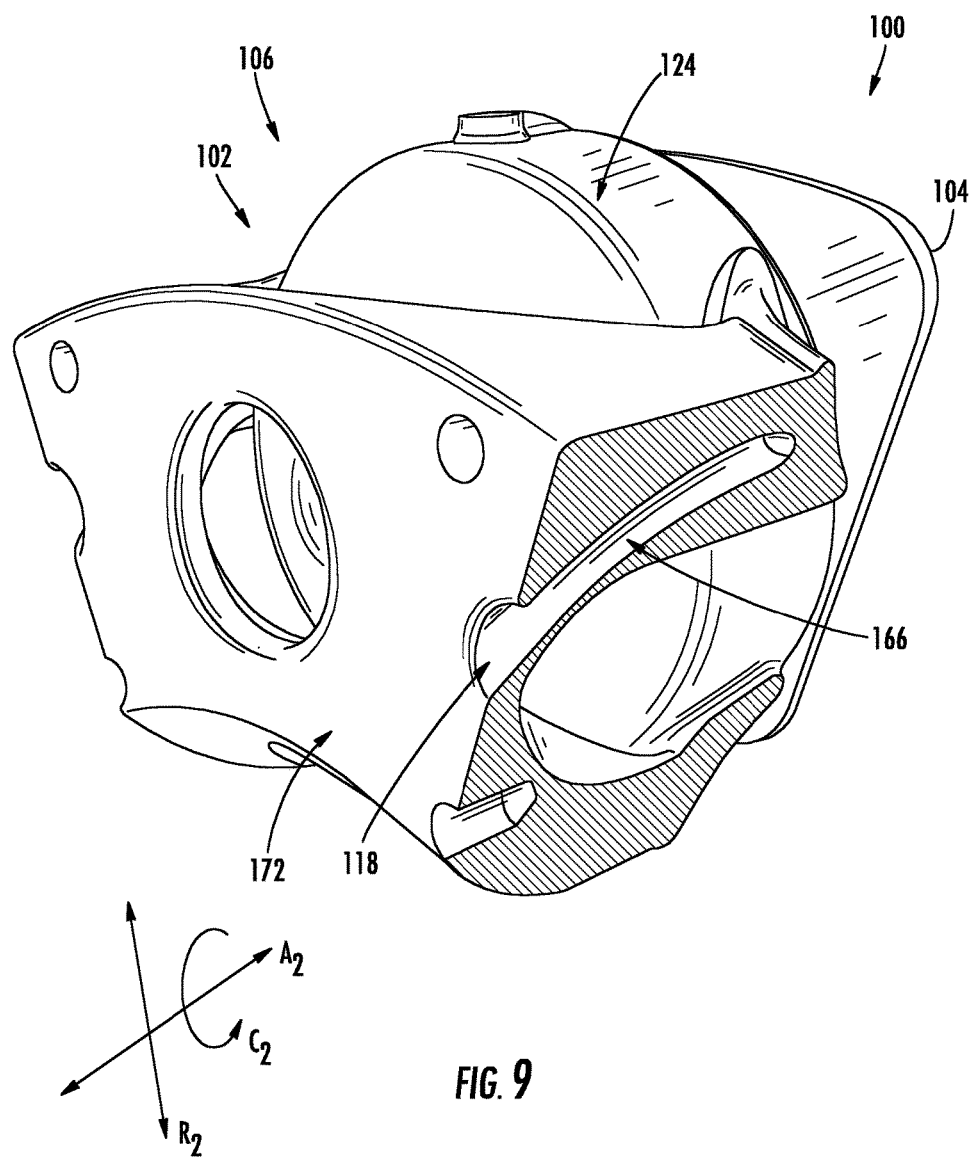
FIG. 9 is a perspective view of the section of the exemplary bearing of FIG. 8.

Referring now also to FIG. 9, providing a perspective, cross-sectional view of a section 106 of the exemplary bearing 100 of FIG. 8, the inlet gas port 118 is, for the embodiment depicted, defined on a back face 172 of the housing 102 of the bearing 100. The back face 172 of the housing 102 of the bearing 100 is positioned opposite of the thrust face 108 defined by the bearing pad 104 along the axial direction A2. Additionally, the working gas delivery extension 166 extends from the inlet gas port 118 to the gas distribution ring 168.

Figure 10:
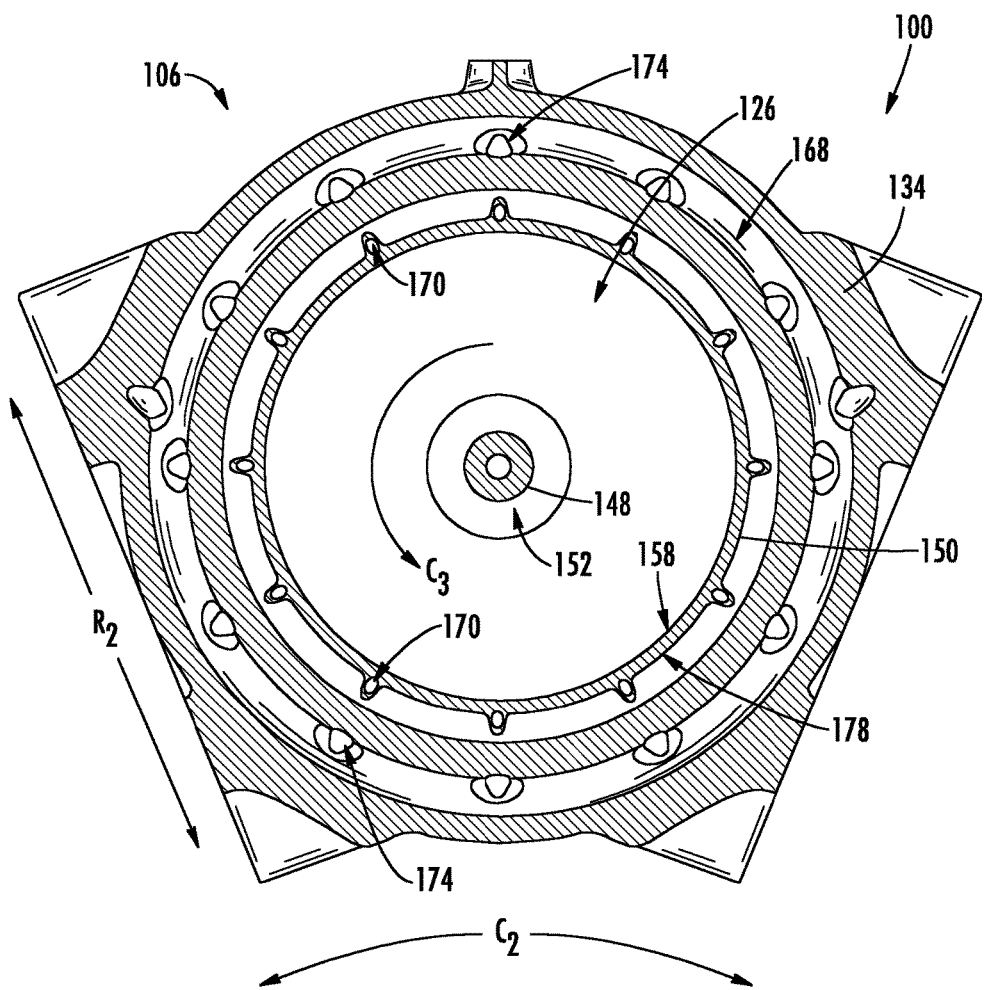
FIG. 10 is cross-sectional view of the exemplary bearing of FIG. 8, taken along Line 10-10 of FIG. 8.
Figure 11:
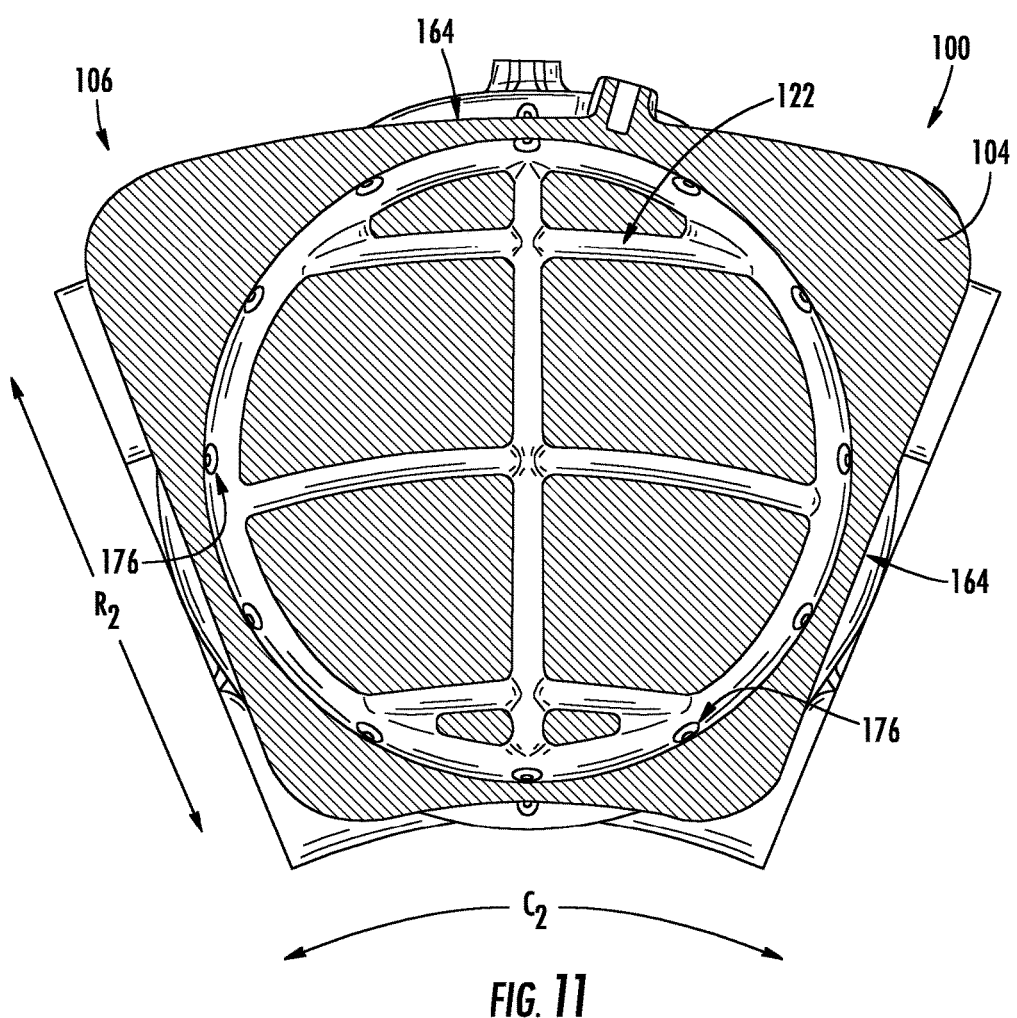
FIG. 11 is cross-sectional view of the exemplary bearing of FIG. 8, taken along Line 11-11 of FIG. 8.

Reference now will also be made to FIGS. 10 and 11. FIG. 10 provides a cross-sectional view of the section 106 of the exemplary bearing 100 of FIG. 8, taken along Line 10-10 of FIG. 8, and FIG. 11 provides a cross-sectional view of the section 106 of the exemplary bearing 100 of FIG. 8, taken along Line 11-11 of FIG. 8.

As shown in FIG. 10, the exemplary gas distribution ring 168 of the working gas delivery system 116 is a circular ring defined by the body portion 134 of the housing 102. As stated, the working gas delivery extension 166 connects the gas port 118 to the gas distribution ring 168. The gas distribution ring 168 is, in turn, in airflow communication with a labyrinth of channels 122 defined in the bearing pad 104 by the plurality of individual gas delivery channels 170 (see FIG. 11). The plurality of individual gas delivery channels 170 extend from a first end 174 (see FIGS. 8, 10) connected to the gas distribution ring 168 to a second end 176 (see FIGS. 8, 11) connected to the channels 122 defined of the bearing pad 104. For the embodiment depicted, each of the plurality of individual gas delivery channels 170 are positioned on the outer wall 150 of the housing 102. More particularly, for the embodiment depicted, the each of the plurality of individual gas delivery channels 170 are positioned on an outer surface 178 (i.e., a surface opposite the fluid damper cavity 126, FIG. 10) of the outer wall 150. Furthermore, as may be seen more clearly in FIGS. 10 and 11, each of the plurality of individual gas delivery channels 170 are spaced substantially evenly around the column 162 formed by the inner wall 148 of the housing 102. More particularly, the exemplary section 106 of the bearing 100 depicted in FIGS. 8 through 11 defines a local circumferential direction C3 extending about the column 162 formed by the inner wall 148 of the housing 102 (FIG. 10). For the embodiment depicted, each of the plurality of individual gas delivery channels 170 are spaced substantially evenly along the local circumferential direction C3.

A bearing formed according to one or more embodiments of the present disclosure may allow for formation of the bearing using a minimal amount of parts or components. Specifically, by forming the bearing using an additive manufacturing process, the bearing may be formed with integral working gas delivery systems and fluid damper cavities having the desired intricate configurations to provide the desired damping ability and support capability in a relatively compact bearing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing defining an axial direction, comprising:
   a bearing pad having a thrust face for supporting a vibration along the axial direction of the bearing; and
   a housing attached to or formed integrally with the bearing pad and defining:
      a working gas delivery system for providing a flow of pressurized working gas to the thrust face of the bearing pad; and
      a fluid damper cavity for providing a dampening of the axial vibration supported by the thrust face of the bearing pad along the axial direction, wherein the fluid damper cavity defined by the housing includes a first control volume, a second control volume, and a damper gap, and wherein the first control volume is in restrictive flow communication with the second control volume through the damper gap.

2. The bearing of claim 1, wherein the housing comprises a first wall and a second wall, wherein the first control volume is defined at least in part by the first wall, and wherein the second control volume is defined at least in part by the second wall.

3. The bearing of claim 1, wherein the fluid damper cavity defined by the housing is a sealed cavity.

4. The bearing of claim 1, wherein the housing comprises a column attached to or formed integrally with the bearing pad, and wherein at least a portion of the fluid damper cavity extends substantially 360 degrees around the column.

5. The bearing of claim 1, wherein the working gas delivery system defined by the housing comprises a working gas delivery chamber, wherein the housing comprises a column attached to or formed integrally with the bearing pad, and wherein at least a portion of the working gas delivery chamber extends substantially 360 degrees around the column.

6. A bearing defining an axial direction, comprising:
   a bearing pad having a thrust face for supporting a vibration along the axial direction of the bearing; and
   a housing attached to or formed integrally with the bearing pad and defining:
      a working gas delivery system for providing a flow of pressurized working gas to the thrust face of the bearing pad; and
      a fluid damper cavity for providing a dampening of the axial vibration supported by the thrust face of the bearing pad along the axial direction, wherein the working gas delivery system defined by the housing comprises an inlet gas port for receiving a flow of pressurized gas and a working gas delivery chamber, wherein the housing comprises a wall, and wherein the working gas delivery chamber is defined at least in part by the wall.

7. The bearing of claim 6, wherein the wall is attached to or formed integrally with the bearing pad for supporting the bearing pad.

8. The bearing of claim 6, wherein the working gas delivery chamber is concentric with at least a portion of the fluid damper cavity.

9. A bearing for a gas turbine engine, the bearing defining an axial direction and comprising:
   a bearing pad having a thrust face for supporting a vibration along the axial direction of the bearing; and
   a housing attached to or formed integrally with the bearing pad, the housing defining:
      a working gas delivery system for providing a flow of pressurized working gas to the thrust face of the bearing pad; and
      a fluid damper cavity for providing a dampening of the axial vibration supported by the thrust face of the bearing pad along the axial direction, the fluid damper cavity including a first control volume and a second control volume, the housing comprising a first wall and a second wall, the first wall at least partially defining the first control volume and the second wall at least partially defining the second control volume.

10. The bearing of claim 9, wherein the housing is formed integrally using an additive manufacturing process.

11. The bearing of claim 9, wherein the housing is formed integrally with the bearing pad using an additive manufacturing process.

12. The bearing of claim 9, wherein the fluid damper cavity defined by the housing further includes a damper gap, and wherein the first control volume is in restrictive flow communication with the second control volume through the damper gap.

13. The bearing of claim 9, wherein the fluid damper cavity defined by the housing is a sealed cavity.

14. The bearing of claim 9, wherein the working gas delivery system defined by the housing comprises an inlet gas port for receiving a flow of pressurized gas and a working gas delivery chamber.

15. The bearing of claim 14, wherein the housing further comprises an outer wall, and wherein the working gas delivery chamber is defined at least in part by the outer wall.

16. The bearing of claim 15, wherein the outer wall is attached to or formed integrally with the bearing pad for supporting the bearing pad.

17. The bearing of claim 14, wherein the working gas delivery chamber is concentric with at least a portion of the fluid damper cavity.

18. The bearing of claim 9, wherein the working gas delivery system defined by the housing comprises a working gas delivery chamber, wherein the housing comprises a column attached to or formed integrally with the bearing pad, wherein at least a portion of the fluid damper cavity extends substantially 360 degrees around the column, and wherein at least a portion of the working gas delivery chamber extends substantially 360 degrees around the column.

19. A bearing defining an axial direction, comprising:
   a bearing pad having a thrust face for supporting a vibration along the axial direction of the bearing; and
   a housing attached to or formed integrally with the bearing pad and defining:
      a working gas delivery system for providing a flow of pressurized working gas to the thrust face of the bearing pad;

a fluid damper cavity for providing a dampening of the axial vibration supported by the thrust face of the bearing pad along the axial direction;
wherein the housing comprises a wall, and wherein the working gas delivery chamber is defined at least in part by the wall; and
wherein the wall is configured to bend, flex, or give way during normal operation of the bearing.

* * * * *